(12) United States Patent
Schaaf et al.

(10) Patent No.: US 6,775,582 B2
(45) Date of Patent: Aug. 10, 2004

(54) DATA PROCESSING SYSTEM AND DEVICE FOR IMPLEMENTING COHESIVE, DECENTRALIZED AND DYNAMIC MANAGEMENT OF A TECHNICAL PROCESS

(75) Inventors: Joachim Schaaf, Erftstadt (DE); Wolfgang Schovenberg, Köln (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 10/014,145

(22) Filed: Nov. 30, 2001

(65) Prior Publication Data

US 2002/0116085 A1 Aug. 22, 2002

(30) Foreign Application Priority Data

| Feb. 21, 2001 | (DE) | ......................... 101 08 342 |
| Aug. 17, 2001 | (DE) | ......................... 101 40 470 |
| Aug. 31, 2001 | (DE) | ......................... 101 42 606 |

(51) Int. Cl.$^7$ ............................. G06F 7/00; G06F 19/00
(52) U.S. Cl. ....................... 700/116; 700/115; 700/221
(58) Field of Search ................................ 700/115, 116, 700/221

(56) References Cited

U.S. PATENT DOCUMENTS

| 4,320,502 A | * | 3/1982 | deVeer | ........................ 370/461 |
| 5,478,990 A | * | 12/1995 | Montanari et al. | .......... 235/375 |
| 5,774,875 A | * | 6/1998 | Medeiros et al. | .............. 705/28 |
| 6,246,919 B1 | * | 6/2001 | Hassel | ......................... 700/116 |
| 6,381,509 B1 | * | 4/2002 | Thiel et al. | .................. 700/115 |
| 6,535,777 B1 | * | 3/2003 | Kohler | ........................ 700/112 |
| 6,546,304 B2 | * | 4/2003 | Thorvaldsson et al. | ...... 700/115 |

FOREIGN PATENT DOCUMENTS

| DE | 29512330 | 7/1995 |
| DE | 19920255 | 5/1999 |

* cited by examiner

Primary Examiner—Leo Picard
Assistant Examiner—Elliot L Frank
(74) Attorney, Agent, or Firm—Baker Botts L.L.P.

(57) ABSTRACT

A data processing system and device for a cohesive technical process are disclosed. The data processing system includes at least one processing station for processing at least one product with an associated specific data record in which product features and/or process information for the product are maintained. The processing station may also include associated data and product buffers. The product associated data record may be provided in a decentralized manner at the processing station during the technical process and can be passed-on to a further processing station. The processing station further comprises data record storage locations that may be used dynamically. The data record for a product may be dynamically matched to a data record length required from a process sequence.

50 Claims, 9 Drawing Sheets

DATA PROCESSING SYSTEM AND DEVICE FOR IMPLEMENTING COHESIVE, DECENTRALIZED AND DYNAMIC MANAGEMENT OF A TECHNICAL PROCESS

FIELD OF THE INVENTION

The invention relates to a data processing system and device for a cohesive technical process, having at least one processing station for an initial product or end product of the process both of which have an associated specific data record for administering features and/or process information for said products and wherein the processing station has an associated upstream or downstream product buffer.

BACKGROUND OF THE INVENTION

The reference DE 295 12 330 U1 discloses a device for product data maintenance for a technical process in which a product has associated production documentation which records relevant data, for example equipment versions, accompanying papers, test records etc. Some of this documentation is attached to the product, and/or is used for internal documentation.

It is also known for a product which has different equipment versions to have associated equipment and/or configuration information, accompanying the process, associated with the product, in the form of a logcard, a sticker associated with the product, or in an electronic form. This is used not only for comprehensive company-internal production description or quality analysis, but also is used to assist in reconstruction of the product life cycle in the event of any subsequent claims. These data records are administered and recorded using a central computation system, which is linked via a bus system to every relevant processing station in the technical process.

A packaging machine is disclosed in DE 199 20 255 A1 which has a revolving brochure feed apparatus, having a large number of holders, each of which holds one brochure, and by means of which a brochure can be positioned in front of a product cup in a product chain. Furthermore, the packaging machine has a feed apparatus, by means of which the brochure can be inserted into the holder of the brochure feed apparatus in a handover area. The movements of a folding box chain and of a product chain are synchronized such that the product can be inserted into the folding boxes from the side, transversely with respect to the movement direction of the chains. This is necessary for certain products, for example in the case of pharmaceutical industry products, in particular medications, in order to insert a brochure or leaflet into the pack.

Furthermore, it is well-known that many packaging machines have processing stations with controlled work cycles, such as stations for forming, filling, closing, sealing, perforating or separating products or packages etc. Such packaging machines have been used for a long time, and need no further elaboration.

SUMMARY OF THE INVENTION

The object of the present invention is to design a data processing system for a cohesive technical process such that a data record associated with a product is processed and administered in a decentralized manner during the technical product process. This object is achieved as a result of at least one respective product-associated or partial-product-associated data record being produced and/or varied in a decentralized manner at the respective processing station during the technical process, and which can be passed on in time with the processing to the respective processing station. The data traffic associated with the products therefore does not load central data lines, since only the data required for subsequent processing stations in the technical process and the data required for subsequent documentation is interchanged between adjacent processing stations.

A preferred embodiment of the present invention is where the functionality of the product and/or process data handling of the technical process is formed in a decentralized manner via data processing appliances. Autonomous units with respectively associated data processing system functions are thus set up in a distributed manner. According to the invention, the tasks normally carried out by at least one separate, central host computer are carried out by decentralized data processing appliances. The processing rate is thus not dependent on all the processes running in parallel in the host computer, and computation power required on a decentralized basis can be configured independently and individually for each of the processing stations.

Another preferred embodiment of the invention is the dynamic use of data record storage locations in a processing station. It is thus possible to optimally fill the physical memory installed in the processing station with product data records. Data record storage locations, having data record size which is fixed in advance in a processing station, utilize the physical overall memory that is provided optimally only if the maximum data record length of a storage location matches the product data record length. Dynamic storage space administration advantageously allows different product data record lengths and, in the process, the predetermined total memory size can be used flexibly and optimally.

Another preferred embodiment of the invention is where the data record for an initial product or end product is dynamically matched to a data record length required from the process sequence. Hence, only data which is relevant to the further processing stations is interchanged between two processing stations. Dynamic data record length adaptation allows a data record to be used which varies depending on the process or product requirements. The data record can be enlarged or reduced at any processing station. If, for example, it is found from a specific feature of a product or partial product that process sequences which have already been carried out are repeated, or that additional process steps are required (tolerance discrepancies, defective parts, incomplete processing steps etc.), then the additional data can be dynamically attached to the already existing product data record. The dynamically amended data record can be used at a later time to analyze and reconstruct the processing steps carried out, particularly any processing steps which may have been repeated. One version of this preferred embodiment comprises the combination of at least two product data records, having a predetermined memory size and linked via pointers or via a link that has been entered. These records are held in at least two storage locations, but are logically associated.

Another preferred embodiment of the invention is where the data record structure of an initial product and/or end product is composed of at least one of the following data record entries, which may be combined if required:

identifier for features;
data type information;
feature;
dimension unit for one or more features;

limit values of features;

validity identifier for features;

access authorizations; and process information for an initial product and/or end product.

This procedure allows assignment of information which can be uniquely associated with an initial product and/or end product and describes characteristics (features) which are advantageously associated with the product.

The data record entries are described in more detail in the following text:

an identifier describes the name of a feature such as "weight", "date", "number";

the actual value is entered in a feature, for example, an entry "10" is made into the feature for a "10 kg" entry;

data type information is used to define how the individual feature data items occur, for example as an integer, real, pointer, text type etc.;

a dimension unit describes the dimension unit of a physical variable, for example "kg", "m/s", "number" etc.;

upper and lower limits for respective features are provided in the data record by means of feature limit values;

validity identifiers for features are used to define whether the features of an initial product and/or of an end product have been described validly in the respective data record;

access authorizations for each feature are used to control whether users, processing stations, data processing appliances or authorized processes etc. may access data records and/or features and what data rights are assigned to them; and process information allows, for example, information accompanying a process to be stored, such as the ambient temperature, processing personnel at the processing stations, etc. It is also feasible for an additional product-summarizing validity feature to identify a product overall as "good" or "poor".

Another preferred embodiment of the present invention is where at least one data record entry is provided for a link in the data record structure of an initial product and/or end product. This advantageously makes it possible to centrally store comprehensive and recurring data record entries, such as process information with a large amount of detail, while only a link to the storage address is added to the product data record. In this case, the data record entries can be stored centrally in a processing station. Such data can later be stored, for example, on a data server. This makes it possible to drastically reduce the amount of data passing between the processing stations. This procedure allows the product data record entries to be reduced to individual entries that are absolutely essential. If necessary, however, the link entries, for example, in the product data record provide further data on data servers. Furthermore, it is also possible to link data records or data record entries to one another.

Another preferred embodiment of the invention is where information about a link entry in the data record can be called up by means of a data link. This makes it possible for a user or service technician to call up additional information. The data available at the link address is in this case stored and provided centrally. Additional information may include:

information about a manufacturing company;

information relating to new products;

information relating to product changes;

information relating to product support (documentation, help, hotline support, discussion forums, drivers, patches etc.); and contact record (telephone numbers, e-mail addresses, online help, contacts, ordering of accessories).

A further preferred embodiment of the present invention is where limit values for at least one product feature and/or for at least one data record entry are stored in processing stations and are used for limit-value checking. This makes it possible to check whether a product feature and/or a data record entry has overshot or undershot limit values. In this case, there is at least one limit value in the checking process station, which is not transported with the data record thereby reducing the amount of data being transported. By way of example, a processing station for product or process features can read from a list the features to be checked for a respective product, and can check compliance with at least one limit value, and, if necessary, can note the result of the check in the data record. In this case, it is also possible to check whether a feature is between two limit values.

Another preferred embodiment of the invention is where products and/or data records can be searched for any required product or data record features. It is thus possible to localize products, and their data records, uniquely at any time in the technical process, by means of features. By way of example, a convenient search mask can be called up via a control and monitoring unit, in which a search can be carried out on the basis of various criteria. For example, it is still feasible for the products that are found, or a selection of them and their associated data records to be identified by the data processing system, and to be given special treatment.

Another preferred embodiment of the present invention is where data or data record structures (or respective parts of them) are provided for visualization and/or amendment on at least one control and monitoring unit. A user or process monitor can continuously or on a one-time basis call up, view, amend or further-processing data information relating to product standards, processing stations or the technical processes.

Another preferred embodiment of the invention is where process and/or product data branching, and process and/or product data combination are carried out via process combination and/or branching stations. Such combination or branching stations allow initial product combination to form a partial product or end product, and allow partial product or end product separation. The data records are also combined or separated to the same extent that products are combined or separated.

Another preferred embodiment of the present invention is where initial products and/or end products can be interchanged with associated data records. A processing sequence on initial products and/or end products can thus be carried out as required. If, for example, initial products and/or end products are accumulated in a collection area at a processing station and are passed on from there randomly for processing, then the data processing system can use a unique product identification, for example an identification number, to take the associated data record from a memory area, and to provide it for further processing.

A further preferred embodiment of the invention is where consistent process and/or product data access is obtained via internal protection mechanisms by means of encapsulated administration functions at the processing stations. Such encapsulated administration functions ensure that only permissible accesses are allowed to the data record and/or, if necessary, only permissible product processing steps are allowed. Accidental accesses, as well as accesses that are used deliberately for manipulation of a product data record and product changes are thus prevented. Encapsulated administration functions thus make it possible to satisfy stringent requirements for production security, safety and reliability.

A further preferred embodiment of the present invention is where error-free data transmission and/or data storage are/is ensured by means of at least one checksum contained in the data record. This advantageously allows data record changes to be detected.

Another preferred embodiment of the invention is where at least one data record, or parts of at least one data record, is or are encrypted. This makes it possible to ensure that the contents of the data record can be accessed only when an associated key is present. It is conceivable that different keys may be required for different data operations (reading, further-processing, amending, writing etc.). For example, different users of the data processing system may be assigned different keys, in which case keys can be stored, inter alia, in the processing station or in the data record.

Another preferred embodiment of the invention is where data storage of at least one data record information item and/or of at least one information item from the technical process can be carried out at any desired time in the data processing system. Any desired information, which may also have a time stamp (time information), can be stored at any time, and can reflect a process state or product state.

A further preferred embodiment of the present invention is where storage of data and information relating to the technical process can be carried out (in the sense of an instantaneous record of all the data) at any desired time in the data processing system. It is thus possible to freeze an instantaneous state of the technical process with all the relevant data.

Another preferred embodiment of the invention is where the data which is relevant to the instantaneous record can be selected in advance or at the time of storage. It is thus possible to define the information to be stored before the deletion of an instantaneous data record. Hence, it is feasible to define different memory profiles which store different information. For example, it may be adequate for process monitoring or for process documentation to store a highly limited number of data items while, in some circumstances, all the data is relevant before a system stop.

A further preferred embodiment of the present invention is where the data or information to be stored is stored in the processing station associated with it at the time of storage. The data can thus be stored in a decentralized manner and in parallel in the respective processing stations.

Another preferred embodiment of the invention is characterized in that the data or information to be stored is stored centrally via at least one data link. Data can thus be administered centrally on a data memory. It is also possible to store and/or to administer different databases on a central data memory.

Yet another preferred embodiment of the present invention is where stored data or information can be fed to the data processing system at any desired time, and, if required, relevant data can be selected in advance or at the time of feeding. It is thus advantageously possible to transfer existing databases, or parts of them. In this case, it may, for example, be necessary to import the data by means of a data filter.

Another preferred embodiment of the invention is where the stored data or information is present in the respective processing station or can be fed to the respective processing station via at least one data link. It is thus possible to load data which exists in the processing station as well as data that exists externally in storage locations which are used by the data processing system during the processing of products. This may be useful, for example, for repair, maintenance, restarting of the entire system or of individual stations and for fault tracing.

A further preferred embodiment of the present invention is where the data links which are also provided for data record transmission, or further data links, are used for data storage or feeding. Already existing data links can thus advantageously be used for storage, for central storage or for central storage in groups. The data lines which transmit data records for products during production operation are used for this purpose, for data storage or data feeding. For example, it is also feasible for data links which are installed exclusively for data storage to be used for feeding as well.

A further preferred embodiment of the invention is where a processing station clock cycle is predetermined by a clock feed and/or by a product or initial product recording, and/or by means of a data record feed. Presetting the processing station clock ensures that synchronous product and data transfer to the subsequent processing station is guaranteed. The ability to select widely differing clock presets for a processing station allows process adaptation to be carried out in a convenient manner. For example, it is feasible to place partial products on a conveyor belt (material path) manually at a first processing station, with them to passing product detection and clock detection at the same time, and to be provided with a basic data record. The processing station clock cycle predetermined by the clock detection is used as the governing processing station clock cycle. It is also possible for manual data inputs to be required for the partial product. In this case, the data record feed or release is used as the governing processing clock cycle. A further possibility for providing a clock for the processing station may be a rigid preset which is provided, for example, by a previous station.

Another preferred embodiment of the present invention is where the processing clock cycles of the processing stations are synchronized to one another. This makes it possible to produce a synchronous processing clock cycle throughout the entire data processing system. All the initial products and/or end products, as well as data records, are passed synchronously through a production process, at the same rate.

Yet another preferred embodiment of the invention is where the processing clock cycles of the processing stations are not synchronized to one another, or are synchronized to one another only in sections. This makes it possible, for example, to optimize production processes having processing times in the processing stations of different length. Asynchronous, autonomous clocking of processing stations or groups of processing stations also makes it possible to deal with irregular deliveries of materials or partial products to the production process. For this purpose, it is necessary for sufficient product and data record buffers to be set up at the processing stations. If, for example, a processing module (for example a memory chip) is fitted in a processing station in a product production line (for example for mobile telephones), all the products which have already been fitted with that module continue to pass through the production line on the basis of the stations following the processing station clock cycle. The products that still need to have the missing module fitted to them enter the existing product and data buffers of previous stations. They accumulate in the production line, but come to rest only in sections, if all the data and product buffers have been filled. When the missing module becomes available again, the components which still need to be fitted are passed to the processing stations once again asynchronously in the production process. This method advantageously makes use of processing capacities in processing stations by allowing the production process to "breath" by means of asynchronous clocking.

A further preferred embodiment of the present invention is where continuous data maintenance is provided if the technical process or at least one data processing appliance fails. Product-relevant data is held in a memory area in the processing station or in a data processing appliance, which memory area is still available even after a process failure. A possible procedure could be as follows: when a data record is sent from one processing station to a subsequent processing station, the data record is maintained in the transmitting processing station until correct reception confirmation has been received from the receiving processing station. In the event of a fault, all the data records and relevant process data are available, at least once, in a non-volatile memory. The product data record chain can thus be reconstructed consistently and on a product-related basis.

Yet a further preferred embodiment of the invention is where redundant links are used as the data link between and/or within processing stations. This ensures that, in the event of a fault in a data link, a further data link is always available. This can be done using the "cold-standby" mode, in which at least one further functionally identical data line is activated only at the time when the first data line fails. In this case, a time delay is possible on the basis of the time interval between fault identification and activation of the second link. In order to avoid this, it is also possible to operate at least two functionally identical data links in the "hot-standby" mode. In this case, at least two data links are activated, with one being the leading data link. In the event of a fault in the leading data link, a data link which is not the leading data link automatically takes over its functionality, possibly in accordance with a predefined scheme.

A further preferred embodiment of the present invention is where the data processing system provides a production flow and data flow which vary as required. This makes it possible for the data processing system or a user to amend a processing or throughput rate for initial products and/or end products, as well as data records. For example, a standard speed can be preset throughout the entire system for the processing stations, which can be varied at any time. If the user stops a processing station (process stop), then the entire process is stopped synchronously in all the processing stations. Furthermore, it is also feasible for a process speed to be preset, even though this process speed can be varied flexibly and autonomously in the system. If, for example, one processing station is stopped (processing station stop), or an initial product and/or an end product needs to be revised in a second run, then the upstream production process continues until the existing product and data record buffers have been filled. The products continue without any disturbance in the process in the downstream process. The processing speed of the data processing system can thus be varied in sections.

Another preferred embodiment of the present invention is where the directions of the material flow of initial products and/or end products and of the data flow can be reversed throughout the entire data processing system or in sections. It is thus possible, in the event of a fault, for individual initial products and/or end products to be passed through a processing station in the opposite direction in order, for example, to process them for a second time. At the same time, associated data records must also be transported backward. This can be done automatically and by means of manual instructions, for example by means of user inputs on a control and monitoring unit. The reference between initial products and/or end products and the respective data records is ensured in all cases when using this method. In the event of a fault in a processing station, the user need not necessarily clear this without any products in order to rectify the fault. Instead the user can "turn back" the production process elements, and start it over again.

A further preferred embodiment of the invention is where any desired number of processing stations can be freely configured with respect to one another. Any desired structures resulting from technical requirements can thus be set up in the data processing system. For example, it is possible to design processing stations as a ring structure without any initial and final processing station. Furthermore, there are no limits on the number of processing stations in the data processing system, since the initial products and/or end products are passed on in serial form. A processing station does not necessarily need to know how many processing stations an initial product and/or end product has already passed through or will pass through. The production of automation solutions is considerably simplified by the present invention since components can be assembled in modular form, and the system can likewise be upgraded in modular form.

Yet another preferred embodiment of the present invention is where the initial products or end products having an associated data record are input and output, respectively, via input and/or output stations. Such input and output stations allow product removal with the associated data record, and a copy of the associated data record. The input and/or output stations make it possible, for example, to carry out manual processing or product checks on the initial products or end products. If a product is output with a copy of its data record, then the output information can be noted in the original data record and can be passed on in the process chain. The product and data record can also be input into the process once again, in a similar manner.

Another preferred embodiment of the invention is where processing stations can be included or excluded at any desired point in the technical process. Since the products and data are passed on in serial form in the data processing system, process stations can be introduced into the technical process, or removed from it in a simple manner due to a free, and hence flexible, configuration capability. This can be done by program changes carried out in the subsequent processing stations downstream from the inserted or removed processing station or stations, or the maximum number of data records in the respective data buffer can be determined automatically by automatic data record length identification or data record management. The latter considerably increases the flexibility of decentralized processing station upgrading for the user since he does not need to pay any attention to software matching tasks which arise when processing stations are administered centrally.

A further preferred embodiment of the present invention is where data records and associated initial products and/or end products are passed on from a respective data or product buffer location to an adjacent data or product buffer location in time with the processing in the respective processing station. Each initial product and/or end product, and each data record thus passes through each product location and each data record storage location in time with the respective processing station. This can be made use of, for example, by means of a chain with compartments or a rotating plate with product locations, which can be passed on in a processing station. If, for example, there is a free product location on a product rotating plate of a processing station which passes through the processing station in time with the processing, then a free data record memory passes through the memory area of the respective processing station in an analogous manner.

A further preferred embodiment of the invention is where data records and associated initial products and/or end products are passed on, when being transferred at the respective processing station, to the next-free data or product buffer location in the respective processing station. This advantageously allows a sliding feed of products to or within a processing station to be mapped in the memory area. If, for example, products in a processing station are passed on via a product slide or rollers, then a product which is transported via the slide or the rollers is always carried to the next free collection point. In this case, a data record jumps over all the free data record storage locations. If the data record is the next for processing in the processing station then this is passed to that free storage space which is the first for processing. If the processing station already contains data records, then the data record is stored in the sequence of a rival, in addition to an existing data record.

A further preferred embodiment of the present invention is where information about an initial product position and/or end product position in the technical process is transmitted by means of data links. It is thus possible, for example, for a user or a computation system to define a product position in the process at any time, since all the initial products and/or end products are registered in a recording area of a processing station.

A further preferred embodiment of the present invention consists of the following:
 a data record is associated with a partial product at an initial processing station;
 the data record is transferred electronically, and the product or initial product is transferred on a material route in a synchronous manner to the coverage area of the next processing station;
 the product-associated and/or initial-product-associated write and/or read operations allowed in the processing stations are carried out there; and
 the data record at a processing end station is passed on to a data processing station, and/or is attached to the product electronically and/or in written form, and/or is deleted.

A procedure such as this in a process chain ensures that each partial product has an associated initial data record which may contain, for example, material information, supplier information, partial product input data, etc. A further significant factor in the process chain is that partial products and/or end products with the associated data record may not enter the detection area of the next processing station unless there is still free space available in the data record memory and product buffer. Since only approved write and/or read operations may be carried out in the process chain via encapsulated administration functions, it is possible to prevent any impermissible change to the data record. If, for example, the product in the processing end station comes from the process chain, then the associated product data record may, if necessary, be subdivided. Customer-relevant data is attached to the product, process-internal information can be stored separately, or in the simplest case, the entire data record can be deleted.

A further preferred embodiment of the present invention is where
 at least one data record structure is produced on the basis of initial product and/or end product features and/or technical process requirements;
 the data record structure is associated with at least one initial product and/or end product; and
 the data record structure can be amended as required in accordance with the requirements.

Any desired data record structures can be generated and, if necessary, amended in accordance with the product and/or process requirements, and the requirements of the data processing system. The data processing system can process the data records independently of their internal structure or their contents. For this purpose, data processing and interchange formats are defined in and between processing stations, in which the data record structure is mapped, for example, by means of an engineering system for configuration and commissioning. It is possible for each initial product and/or end product to be assigned to the same data record structure, for at least two initial products and/or end products to have the same data record structure, or for all the initial products and/or end products to have a different data record structure.

A further preferred embodiment of the invention is where the data processing system is used in process automation. A product-associated data record can thus be processed and administered in a decentralized manner during the technical process, for process automation.

A further preferred embodiment of the present invention is where the data processing system is used to carry out balancing processes for any desired product and/or data record features and/or process parameters and/or process information. It is thus advantageously possible, inter alia, to carry out statistical evaluation of information relating to the technical process, or of product features and/or data record features. A feature, which is defined in advance, of products or of process parameters is, for example, counted and is output for this purpose. The balancing process advantageously makes it possible to identify whether fixed parameters of the technical process that have been set have changed (drifted). It is possible, inter alia, to use mean values for this purpose, which can provide indications of parameter drifting, even at an early stage, by means of trend analysis.

Another preferred embodiment of the invention is where the balancing process
 is started by an identification signal, which can be selected as required; and/or
 is carried out over a time interval which can be selected as required or at times which can be selected as required; and/or
 is carried out over a number of samples which can be selected as required or samples which are selected as required; and/or
 is carried out on the basis of product features which can be selected as required; and/or
 is carried out on the basis of process conditions which can be selected as required.

This advantageously allows balancing processes to be started on the basis of different initiating criteria. Thus, for example, it is possible to carry out a balancing process on the basis of an alarm signal or a user request and, as a consequence of this, to record the product identifier (product Id) of data records over a defined time interval, in which an associated data record entry exceeds a definable limit value. For example, it is possible to use widely differing combinations with AND/OR links to carry out a balancing process.

A further preferred embodiment of the present invention is where at least two balancing processes are carried out at the same time. A number of different balancing processes can thus be carried out in the same time in the data processing system.

A further preferred embodiment of the invention is the use of an Ethernet with a real-time capability for at least one data link. A universally useable, standardized bus link with a high transmission rate can thus be used.

A further preferred embodiment of the invention is the use of an equidistant Profibus for at least one data link. An equidistant Profibus makes it possible to use an industrial bus link, which is provable and provides a real-time capability.

Another preferred embodiment of the invention is a device where at least one respective product-associated or partial-product-associated data record is produced and/or varied in a decentralized manner at a processing station during the technical process, and passed on, in time with the processing to the appropriate processing station. This device thus allows product-associated data records to be interchanged between two processing stations, without having to load central data lines. Furthermore, only the computation power which is required in the centralized form at the processing station need be installed, and which is required for data processing and for data transportation to the respective station. The device according to the invention is of modular construction and thus offers the user a range of advantages for combination and setting up (costing savings, simple storage, easy replaceability, etc.).

A further preferred embodiment of the present invention is where a data processing system as previously disclosed is run on a data processing device. All of the advantages mentioned above can thus be realized in the device according to the invention.

A further preferred embodiment of the invention is where the data processing system is run on at least one closed-loop and/or open-loop control unit in the processing station. The data processing system can thus be integrated in the closed-loop and/or open-loop control unit in processing stations, and can advantageously use the same resources. A host, a process controller or else control systems close to the drive can be used as the closed-loop and/or open-loop control unit.

Another preferred embodiment of the invention is where the data processing system can run on at least one data processing appliance having a PC-based architecture. The capability to use a personal computer (PC) as the computer for the data processing system makes it possible to use a large number of cost-effective, commercially available and easily available hardware and software developments, which can be used advantageously in the described invention.

Yet another preferred embodiment of the present invention is where the data processing system can run on a machine tool, a production machine or on a robot, hereinafter "machines." Said machines are being increasingly included in complex technical processes that are subject to stringent quality requirements. Furthermore, there are user demands for flexible and simple process and production chain modification, with an open production line structure that is at the same time modular. These demands can advantageously be taken into account by means of the present invention. Thus, for example, documentation without any gaps can be achieved by means of the herein-disclosed characteristics of the data records of the data processing system, and the processing station structure. The data which is passed on, as well as the associated initial products and/or end products, allow the processing stations to be rearranged flexibly, even in different production lines, without any need for complex, central software configuration. The computer power and the functionality of the data processing system are formed in a decentralized manner in the machines, and can be run depending on the requirements of the respective processing station.

Yet another preferred embodiment of the present invention is where the machine on which the data processing system is running is a packaging machine. The use of the invention for packaging machines results in a high level of production safety, security and reliability, with very stringent production requirements. This is particularly important, for the packaging of medicaments, for example, by a pharmaceutical packaging machine. By means of data records which can be associated with products uniquely and at any time, and which, for example, have special safety and security measures in their data record structure as well as for data record write operations, the invention ensures that faulty products in the production chain will be identified, thereby eliminating any chance of their entering circulation. This offers clear advantages to the user of packaging machines with the device according to the invention, for example in the form of cost savings, since it is considerably easier to verify that the production process is safe, secure and transparent. Hence, a pharmaceutical packaging machine constitutes a further preferred embodiment of the present invention.

BRIEF DESCRIPTION OF THE DRAWINGS

Various preferred embodiments of the present invention are described in detail in the following text and are illustrated in the drawings, in which.

DETAILED DESCRIPTION OF THE INVENTION

Figure 1:
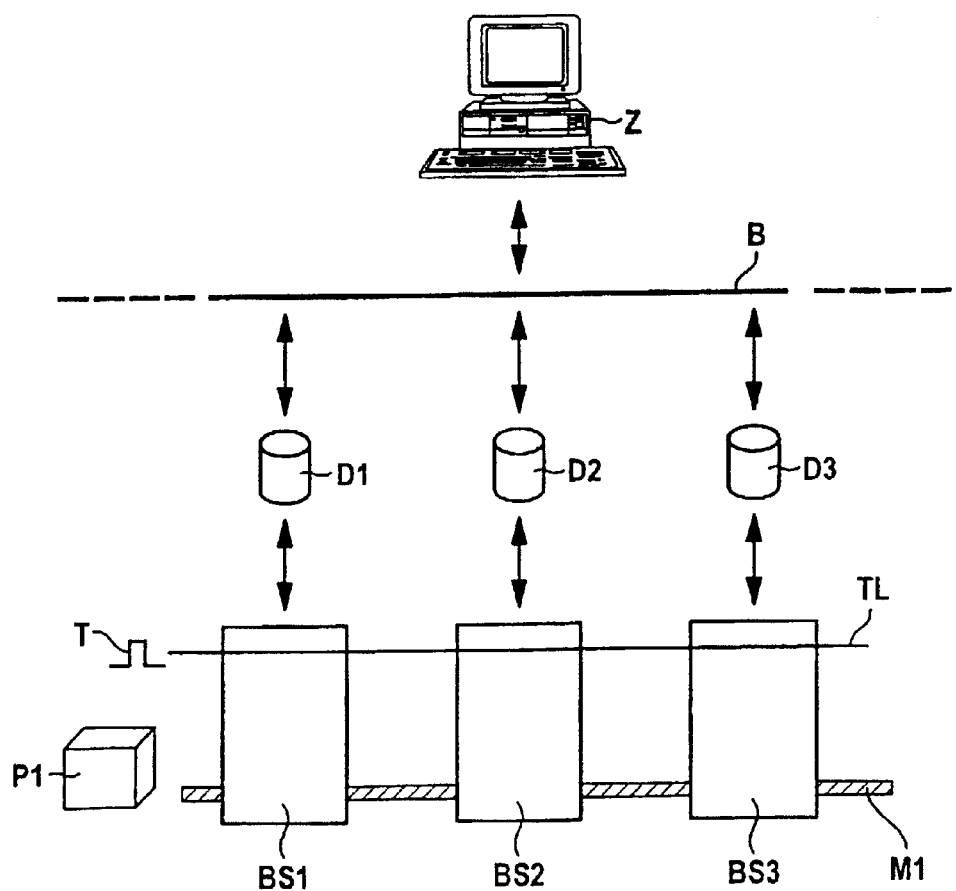
FIG. 1 shows a schematic layout of a centrally controlled individual solution for a technical process.

FIG. 1 shows a schematic illustration of a data processing system for a cohesive technical process with centrally controlled process data administration. A central computation unit Z, here a PC station, is connected via a bus system B to the processing stations BS1 to BS3. The central bus link B is represented by a single bold line, ending with dotted-line sections at both ends. The dotted lines at the two ends indicate that additional networks are possible in a computer system, or else networks to further processing stations BS1 to BS21. The double arrows in FIG. 1 indicate possible bidirectional data interchange. The data records D1 to D3 shown as barrels inserted between two double arrows represent the respective data record D1 to D3, which is transmitted from the associated processing station BS1 to BS3 to the central computation unit Z. The processing stations BS1 to BS3 are represented as empty rectangles.

An optional clock line TL, on which a process clock T can be fed in, runs through the processing stations BS1 to BS3. A process clock T can also be transferred from the central computation unit Z to the processing stations BS1 to BS3, or can be produced locally in the processing stations BS1 to BS21.

The material route M1, which carries a product P1 through the process chain, is located upstream of, downstream from and between the processing stations BS1 to BS3. The material route M1 is represented by hatched areas.

Figure 2:
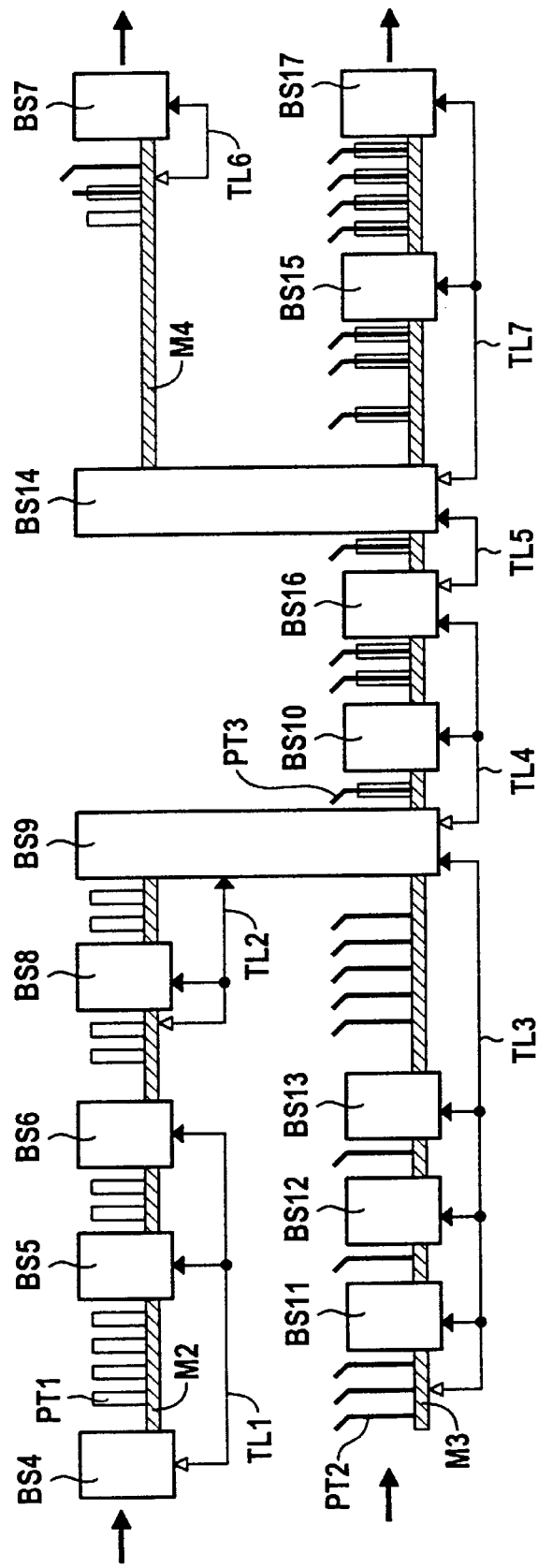
FIG. 2 shows a layout of an example of a production line with decentralized data record administration.

FIG. 2 shows, schematically, a layout of a production line with decentralized data record administration. The processing stations BS4 to BS17, which are represented by empty rectangles, are located in the production line. A product type PT1 is located on the material route M2 downstream from the processing station BS4. The product type PT1 is indicated by a narrow rectangle, positioned vertically on the material route M2. The material route M2, represented by a hatched line, runs from the processing station BS4 to the processing station BS9. The product type PT1 in this case passes successively through the processing stations BS5, BS6 and BS8, and enters the material route M3 in the processing station BS9. FIG. 2 shows the material route M3 transports material to the processing stations BS10 to BS17.

A product type PT2, which is represented by a vertical line angled at the top can be seen upstream of the processing station BS11 in FIG. 2, and passes successively through the processing stations BS12, BS13 and BS9. The product types PT1 and PT2 are joined together in the processing station BS9. The processing station BS9 thus represents an input station, in which the product types PT1 and PT2 are joined together.

The product types PT1 and PT2 which have been joined together after the processing station BS9, result in a new product type PT3, which is represented by a small open rectangle combined with a vertical line angled at the top. The product type PT3 passes through the processing stations BS10 and BS16 and, on the basis of defined criteria is left on the material route M3 or is passed to the material route M4 in the processing station BS14. Products of the PT3 product type which, for example, have areas of damage, are passed to the material route M4, which runs from the processing station BS14 to the processing station BS7. Three products shown upstream of the processing station BS7, which differ from the product type PT3, are intended to be regarded as being damaged, and therefore do not continue any further on the material route M3 downstream from the processing station BS14.

Products which are not passed to the material route M4 in the processing station BS14 continue on the material route M3 to the processing station BS15, and onward to the processing station BS17. The material route M1 to M5 for the products P1 to P15 need not end at these stations BS1 to BS21, since there may also be further processing stations BS1 to BS21. This is indicated by solid arrows at the processing station BS7 and the processing station BS17 which run parallel to the respective material routes M1 to M5, and which point away from the respective processing stations BS7 and BS17. Further processing stations BS1 to BS21 may likewise be positioned upstream of the processing stations BS4 and BS11 and are indicated by solid arrows pointing toward the processing stations BS4 and BS11, respectively.

Clock lines TL1 to TL7 are parallel to the material routes M2 to M4. An empty arrowhead under a processing station BS4 to BS17 or under a material route M2 to M4 indicates a clock detection point. This clock, which is received there, is passed on to subsequent processing stations BS5 to BS17. A clock transfer point under or alongside a processing station BS4 to BS17 is indicated by a solid arrowhead. Clock signals, clock detections and clock lines may also be in virtual form, using software.

The function of the clock handover or transfer points will be explained hereinbelow. In FIG. 2, the processing station BS4 passes a processing station clock T, via a clock detection point, to the processing stations BS5 and BS6. Synchronized with the processing station clock T, products P1 to P15 of a product type PT1 are passed with associated data records D1 to D23 in serial form to the processing stations BS5, BS6 and BS8. For the sake of simplicity, these data lines are not shown in FIG. 2. When a product P1 to P15 of the product type PT1 leaves the processing station BS4 it enters the coverage area of the processing station BS5, provided free spaces are still available in the data record and product buffer PP1 to PP4.

The processing station BS8 receives its processing station clock T from the detection point on the material route M2 via the clock line TL2. The processing station clock T which is received is also passed to the processing station BS9. The clock receiving and forwarding lines of the clock lines TL3 to TL7 are based on the same pattern, and are not further described.

Figure 3:
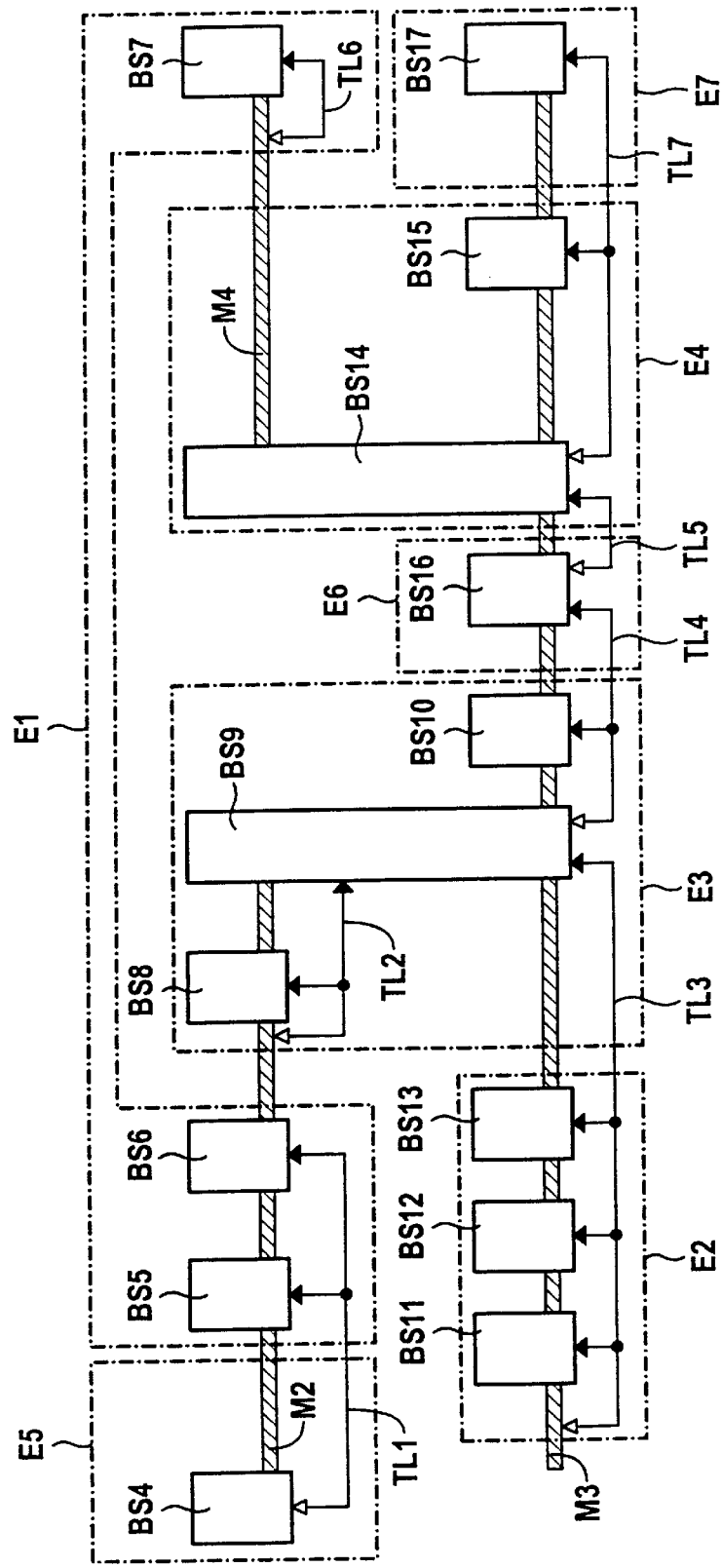
FIG. 3 shows a basic layout of a decentralized appliance organization for processing stations.

FIG. 3 shows a decentralized appliance organization option for processing stations BS1 to BS21. The processing stations BS5 to BS7 are combined in the unit E1, the processing stations BS11 to BS13 are combined in the unit E2, the processing stations BS8 to BS10 are combined in the unit E3, and the processing stations BS14 to BS15 are combined in the unit E4. The processing stations BS4, BS16 and BS17 are associated respectively with the individual stations E5, E6 and E7. The units E1 to E7 may, for example, represent a programmable logic controller, a control system close to the drive, a PC-based drive system etc., and may also have the functions of data processing appliances.

According to the present invention, the data processing system for a cohesive technical process may be subdivided into widely differing decentralized units E1 to E7. Where unit E1 to E7 serves a number of processing stations BS1 to BS21, then joint functions or tasks, such as failsafe data back-up by means of a nonvolatile memory can be used jointly.

Figure 4:
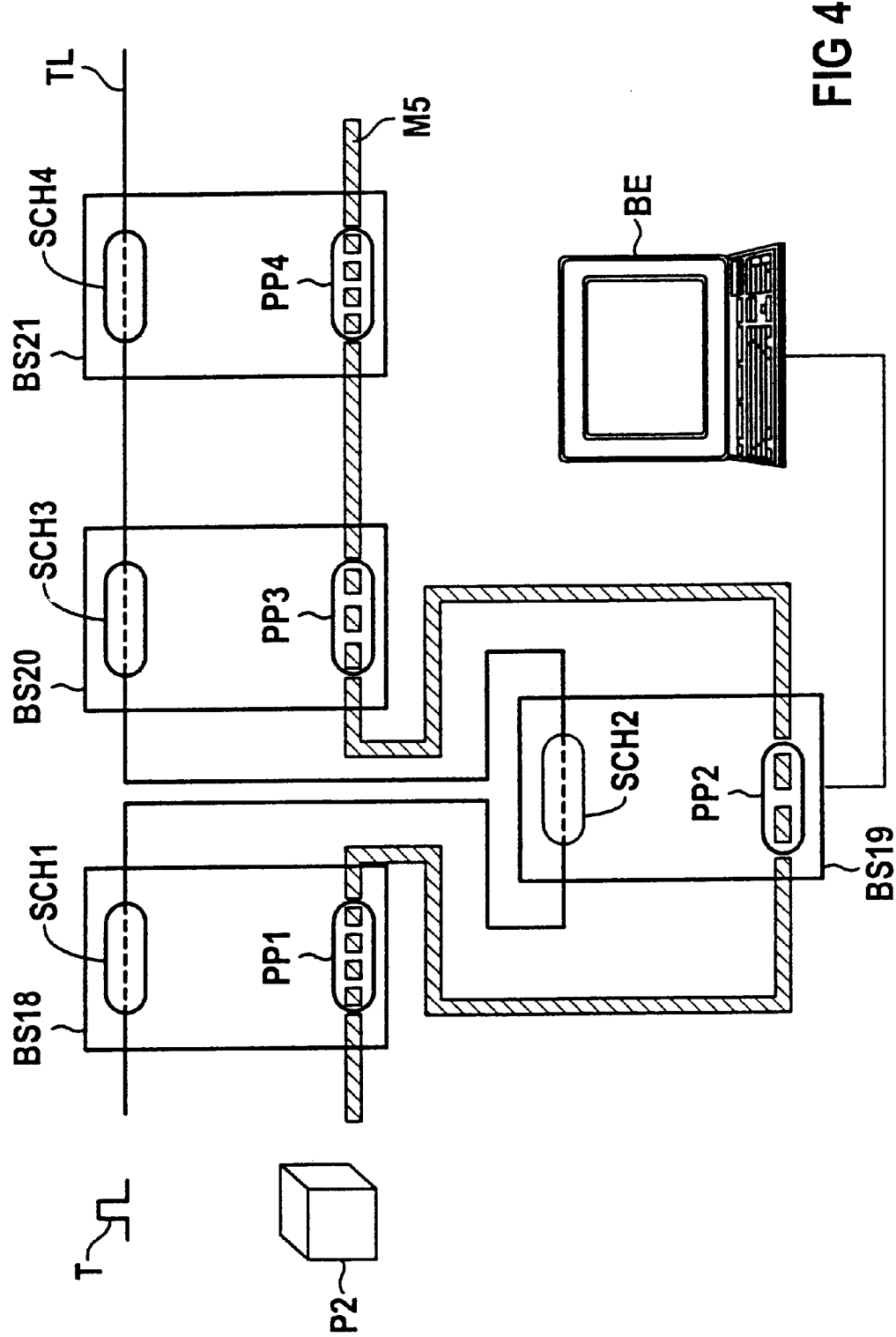
FIG. 4 shows one option for looping appliances into a production line.

FIG. 4 shows a simple option for looping a processing station BS19 into the material route M5. The processing station BS19 has been inserted between the processing stations BS18 and BS20. A product P2 on the material route M5 thus passes from the processing station BS18 to the processing station BS21. A clock T can also be passed on downstream from the processing station BS18, via the processing station BS19 to the subsequent processing stations BS20 and BS21.

In the processing stations BS18 to BS21, the storage locations for the product data P1 to P15 are organized in the form of shift registers SCH1 to SCH4. The shift registers SCH1 to SCH4 are symbolized by an oval shape with an internal dashed line. The storage locations SP1 to SP24 in the shift registers SCH1 to SCH4 in a processing station BS1 to BS21 have a respective associated product buffer PP1 to PP4. Products P1 to P15 together with associated data records D1 to D23 pass through a processing station BS1 to BS21, for example, in the form of a shift register SCH1 to SCH4.

If a production line needs to be increased or reduced in size owing to product changes, then this change can be implemented in a flexible manner by simple, serial insertion of a processing station BS1 to BS21. A product data record D1 to D23 which is located in a storage location SP1 to SP24 in the shift register SCH1 to SCH4, can be enlarged dynamically at the inserted processing station BS1 to BS21.

In a production line controlled by a central computation unit Z, the central sequence program and/or control program must be amended when a processing station is inserted. Furthermore, the data traffic in the bus system B increases by the amount of data D1 to D23 required by and transmitted to the inserted processing station BS1 to BS21. If the data records D1 to D23 are administered and passed-on on a decentralized basis, then only the amount of data passed-on increases by the amount of data added in this data record D1 to D23. There is also no need for any complex change to be made to a program in a central computation unit Z, and the enlarged data record D1 to D23 is just passed on in serial form through the subsequent processing stations BS1 to BS21.

Only the two stations that are involved communicate with one another on the data link between two processing stations BS1 to BS21. If there is a central bus system B, all the data traffic takes place there and at the central computation unit Z.

A control and monitoring unit BE is located at the processing station BS19, allowing data, data records D1 to D23, process information etc. to be called up, depending on the access authorization. The control and monitoring unit BE is indicated symbolically by a screen and a keyboard in the illustration in FIG. 4.

A control and monitoring unit BE can view data that is available at any processing station BS1 to BS21. However, a configuration is also feasible in which a control and monitoring unit BE can access data from further processing stations BS1 to BS21. It is thus possible to display all the technical process data, and/or to display details of the respective processing stations BS1 to BS21. The control and monitoring unit BE can be connected upstream or downstream of a further data processing appliance, or a unit E1 to E7, such as a personal computer (PC), which can carry out a data preprocessing and/or archiving functions. Access from the monitoring and control unit BE can be controlled by authorizations and keys.

Figure 5:
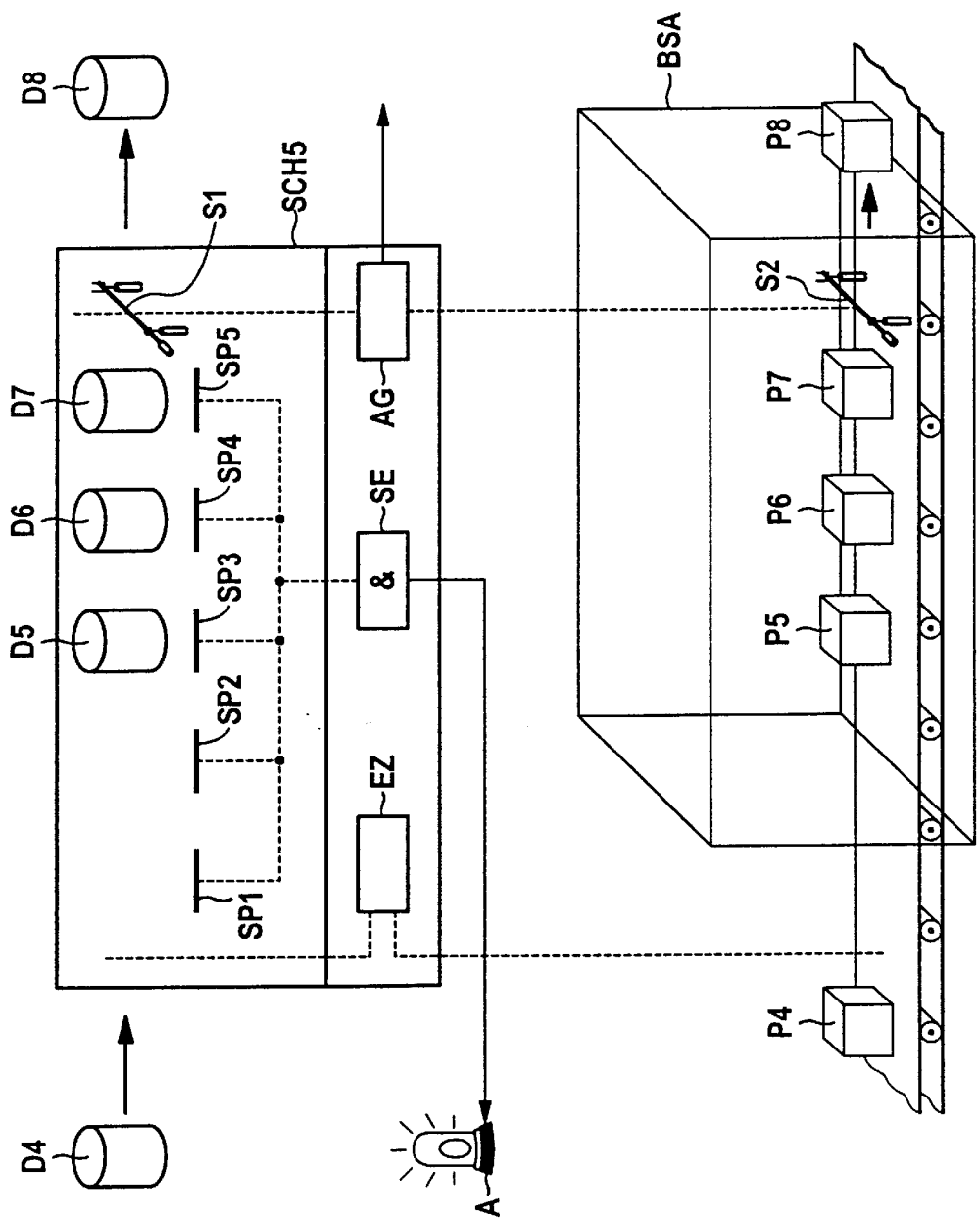
FIG. 5 shows a schematic layout of a data record memory, and product allocation in a processing station.

FIG. 5 schematically shows a shift register SCH1 to SCH6 with product allocation at a processing station BS1 to BS21. A product data record D4 arrives synchronized with an associated product P4 at the input clock counter EZ at the processing station BS1 to BS21. The input clock counter EZ is represented by an empty rectangle from which two dashed lines originate running in front of the shift register SCH5. One dashed line runs in front of the storage locations SP1 to SP5, and records incoming product data records D1 to D23. A further dashed line runs in front of the product buffer PP1 to PP4 of the processing station layout BSA and records arriving products P1 to P15. The product data records D4 to D8 are represented by barrel-shaped cylinders, and the associated products P4 to P8 are in the form of cubes.

Of the storage locations SP1 to SP5 in the shift register SCH5, SP3 to SP5 are filled with the product data records D5 to D7. Thus, there are two free storage locations SP1 and SP2 so that the product data record D4 is allowed into the storage area in the shift register SCH1 to SCH6. In the same way, the product P4 is allowed into the processing station layout BSA since there is also still at least one free product buffer PP1 to PP4. The number of available storage locations SP1 to SP5 need not necessarily match the possible number of product buffer locations in the processing station layout BSA.

The memory state is evaluated by a detection process SE, which is represented in FIG. 5 by a rectangle with an ampersand (&). This is indicated by dashed lines in FIG. 5 which originate from the storage locations SP1 to SP5 and are joined together in the memory state detection process SE. If the entire memory SP1 to SP5 in the shift register SCH1 to SCH6 is full, then a signal is passed to an indicator A. The link from the memory state detection process SE to the indicator is shown by a link in the form of an arrow in FIG. 5. The indicator A is represented in the illustration by a flashing light A. The memory-full signal can also be passed to an upstream processing station BS1 to BS21 where it may lead to a product and data stop. In this case, no further product data records D1 to D23 or products P1 to P15 are passed on to the processing station BS1 to BS21 when the memory state detection process signals that the memory is full. For the sake of simplicity, FIG. 5 does not show any product buffer state indicator, but the same actions are initiated when a product buffer PP1 to PP4 is full. An output clock transmitter AG detects data records D1 to D23 and products P1 to P15, which leave the processing station BS1 to BS21 in a synchronized form.

If a downstream processing station BS1 to BS21 emits a memory-full signal via its memory state detection process SE or its product buffer state detection, then a lock, symbolically indicated by the barriers S1 and S2 shown in FIG. 5, does not allow any data records D1 to D23 or products P1 to P15 to leave the processing station BS1 to BS21. The synchronicity of the barriers S1 and S2 is indicated by a dashed line from the respective barrier to the output clock transmitter AG. A signal link from the output clock transmitter AG of this processing station to a next processing station is symbolized by an arrow, whose arrow head branches off from the output clock transmitter AG.

In the processing station layout BSA, the material routes M1 to M5 are represented by a conveyor belt cut off at both ends. The shift registers SCH1 to SCH6 may also have further state detection processes and functions, which have no further relevance to the basic function, and will therefore not be explained here.

Figure 6:
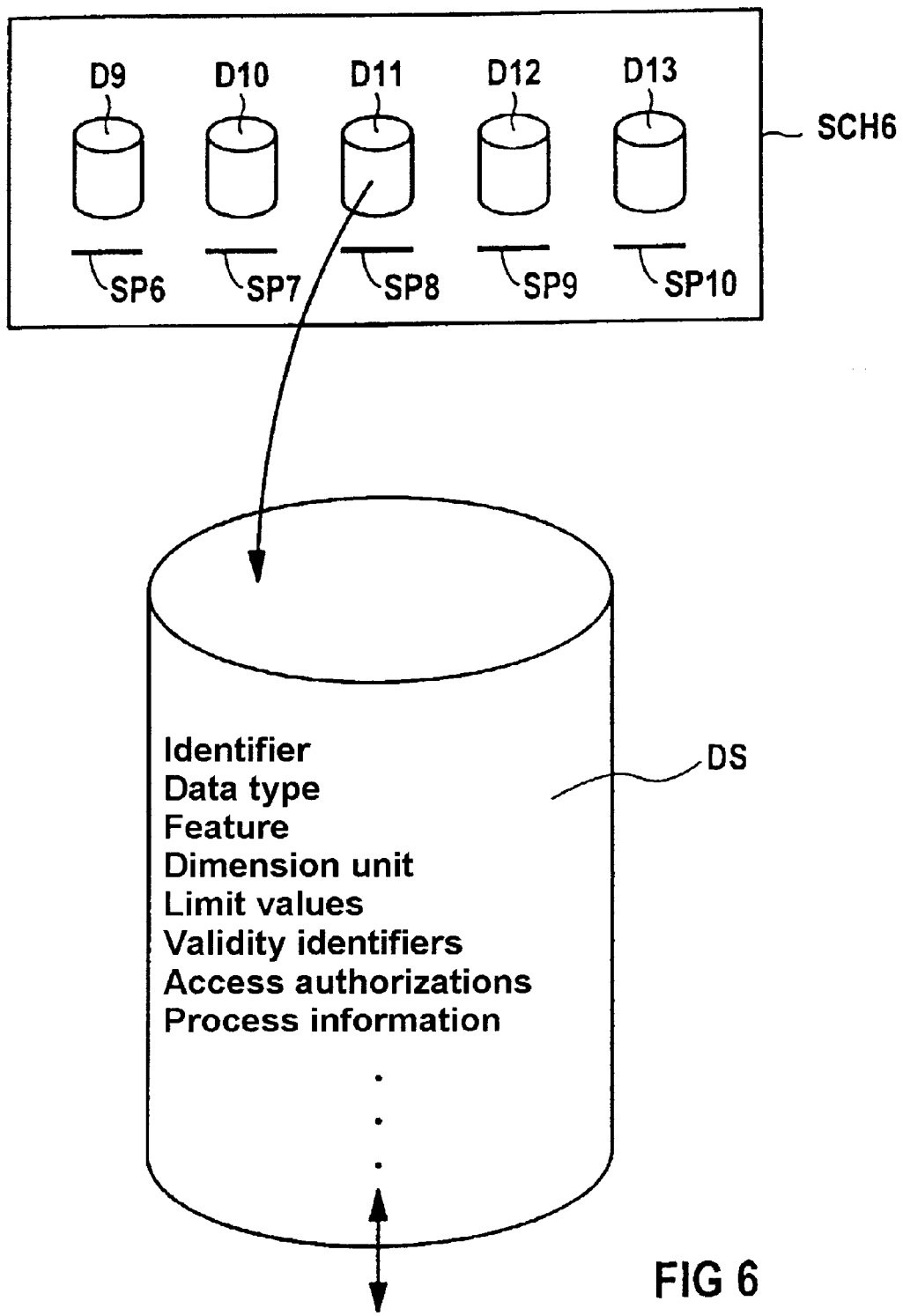
FIG. 6 shows an example of a data record in a decentralized data record memory.

FIG. 6 shows a detail of the shift register SCH6 comprising the product data records D9 to D13 and the storage locations SP6 to SP10. A data record D11 is explained in more detail below in symbolic form together with its data record structure DS. This data record is represented by an arrow originating from the product data record D11 to a large barrel-shaped cylinder. By way of example, the previously explained information contents and/or structures are listed here as product information which can be stored in the product data record D11:

Identifier

Data type

Feature

Dimension unit

Limit values

Validity identifiers

Access authorizations

Process information

Further data record entries are indicated in FIG. 6 by three vertically arranged dots. For example, it is possible for link entries (links) in data records D1 to D23 to be provided as disclosed below. Comprehensive process information with any desired range of details is stored once on a central data processing appliance, or on a data processing appliance which is associated with groups of processing stations BS1 to BS21, such as a web server. The data records D1 to D23 contain a link to this information. The process information is thus attached to the product data records D1 to D23, although it is not continuously passed, as an additional data traffic load, for each product P1 to P15 with its data record D1 to D23 through the data processing system. At the end of the product chain, the information can be attached to the data records D1 to D23.

Furthermore, it is also feasible for the data records D1 to D23 to be attached to the products P1 to P15 in a form allowing data processing, or to be integrated therein. The latter is possible for an appliance having a storage medium (hard disk, ROM etc.). Thus, for example, depending on the access authorization, a user or service technician can use a data link (for example the Internet) to access the link to an associated product data server, and to call up further information.

Figure 7:
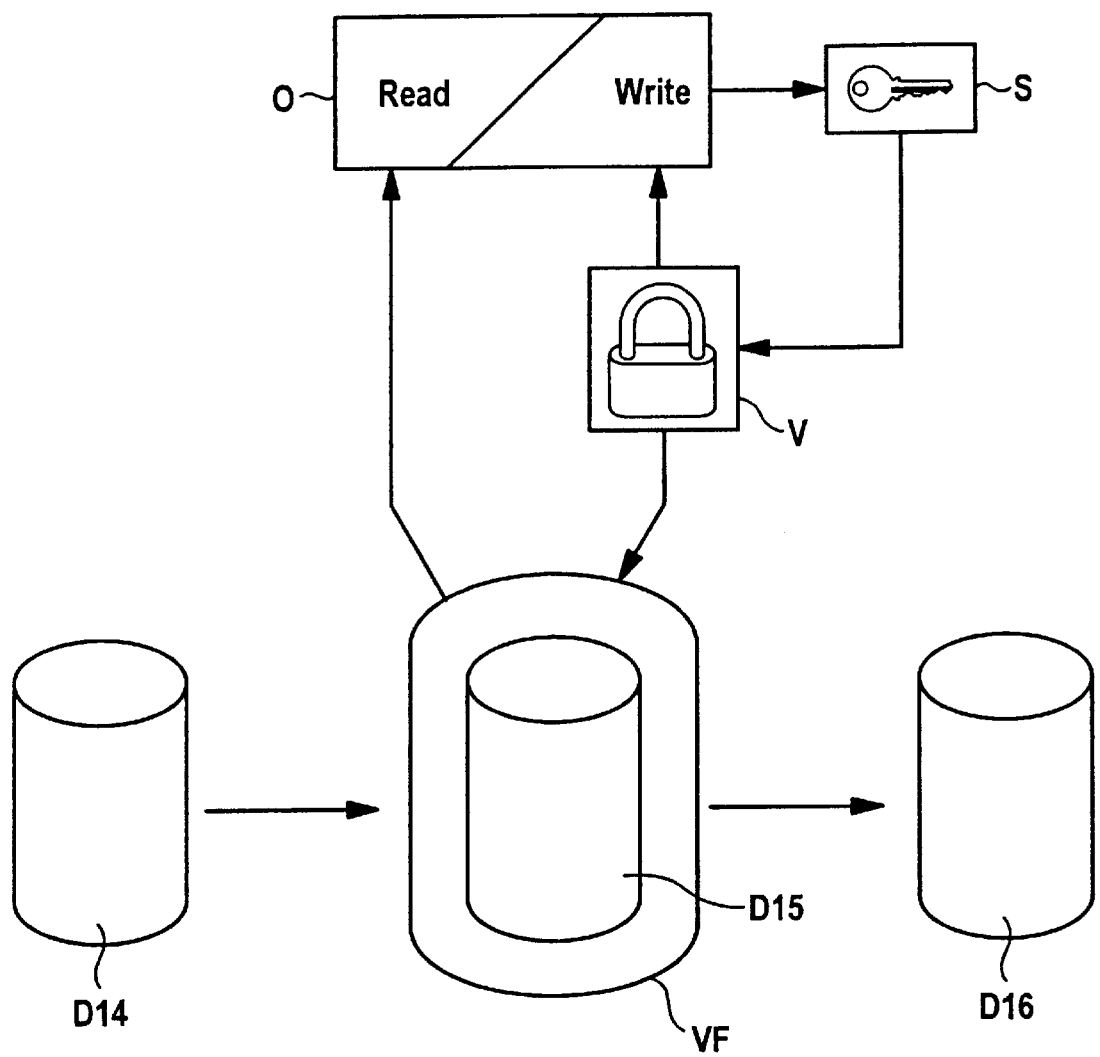
FIG. 7 shows data access via encapsulated administration functions.

FIG. 7 symbolically shows data access via encapsulated administration functions VF. Of the product data records D14 to D16, the product data record D15 is located in the encapsulated administration function VF, which thus allows access to this particular product data record D15 via the authorized read and write operations O. A current product data record D1 to D23 is identified by being located at the focus of the administration function VF. The data records D1 to D23 are shifted in serial form through the focus of the administration function VF, as is indicated by an arrow from the product data record D14 to the administration function VF, and by an arrow from the administration function VF to the product data record D16.

An authorized read or write operation O occurs when a key S which is appropriate for that operation is available for the lock V. In FIG. 7, the key S is represented by a key symbol in a rectangle, and the lock V is represented by a padlock symbol in a rectangle. The arrow links from the read or write operation O to the key S and to the lock V, and from the read or write operation O to the lock V and from there to the administration function VF represent the following situation: when the key S that is required for the read or write operation O is available, then the lock V can be opened and the read or write operation O can be passed through to the administration function VF. The product data record D15 can be written or read, and passes information back to the read or write operation O as appropriate.

Figure 8:
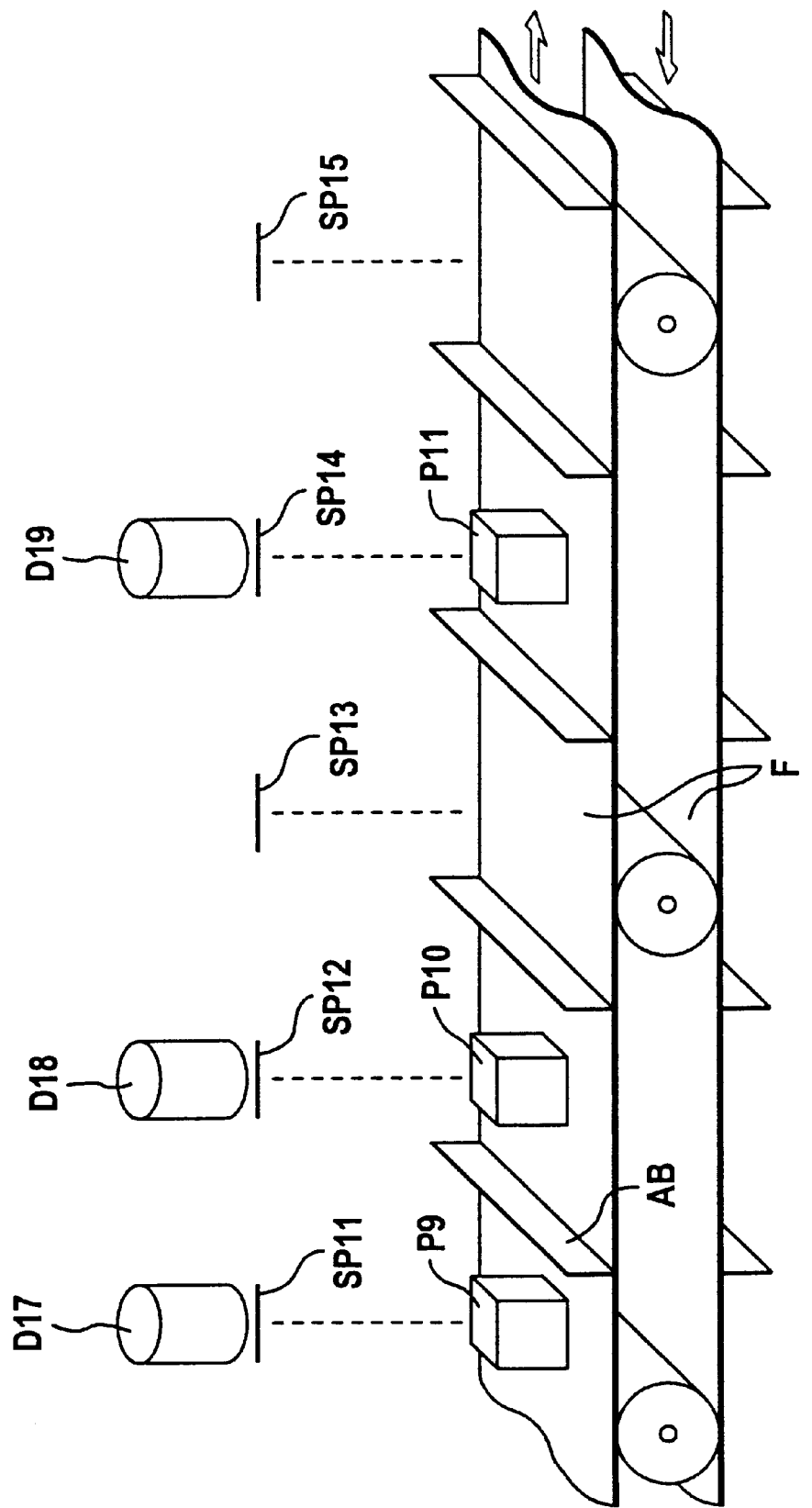
FIG. 8 shows a schematic layout of a product supply with fixed product locations.

FIG. 8 shows a schematic layout of a product supply with fixed product locations. Rigidly divided product locations are present on a conveyor belt F for processing stations BS1 to BS21. A part of the conveyor belt F is shown, with two belts F running in opposite directions on cylindrical rollers R, and has vertical partition walls AB on the conveyor belt F, forming boundaries between the product locations. FIG. 8 shows a partition wall AB and the movement direction of the conveyor belts F is in each case indicated by an arrow horizontally alongside the belts.

Products P9 to P11 are located on the visible product locations, such that there is an unoccupied product location both in front of and behind the product P11. The products P9 to P11 are associated with the data records D17 to D19 in the storage locations SP11 to SP15. The product location on the conveyor belt F is thus mapped in the memory area, that is to say the storage location SP13, which is not occupied by a data record D1 to D23, is located in front of the data record D19, which is associated with the product P11. The unoccupied storage location SP15 is likewise logically associated with the unoccupied product location after the product P11. The logical association between the storage locations SP1 to SP24 and the product locations is in each case represented by a vertically running, dashed line under the storage locations SP11 to SP15. Instead of being passed on by means of a conveyor belt F, the products P1 to P15 can also, for example, be passed on by means of a chain with compartments or a rotating plate having fixed product locations. Chains with compartments or rotating plates may be used, for example, for a bottle filling process.

Figure 9:
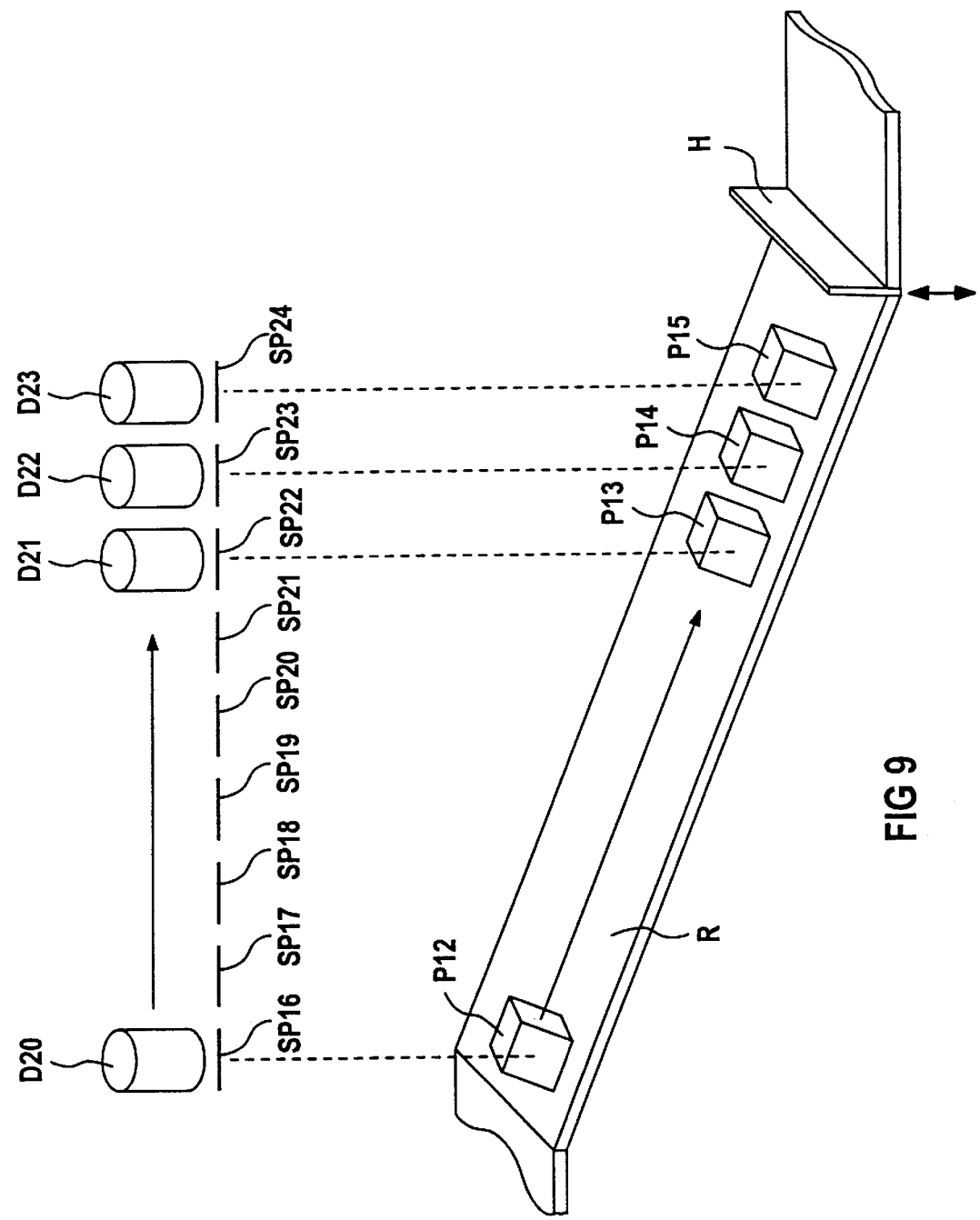
FIG. 9 shows a schematic layout of a slide feed for products.

FIG. 9 shows a schematic layout of a slide feed R for products P1 to P15 to or in a processing station BS1 to BS21. The products P12 to P15 meet the obstruction H on a slide feed R. In this case, they build up in front of the obstruction H, successively filling free product locations. The obstruction H may, for example, be removed with the products P1 to P15 being released cyclically, so that they are transported onward in the technical process.

When the products P12 to P15 arrive on the slide feed R they do not pass through all the product locations in time T with the processing station BS1 to BS21, and an arriving product P1 to P15 passes continually through all the free product locations until it arrives at the obstruction H or at a product P1 to P15 which is already in the queue. This procedure is also reflected in the storage areas SP1 to SP24 of the processing stations BS1 to BS21. The data record D20 that arrives with the product P12 jumps over or passes continuously through the storage locations SP16 to SP20, until, in the storage location SP21, it comes up against the data record D21. The process of the data records D1 to D23 or products P1 to P15 passing through or jumping over continuously is in each case represented by an arrow in the illustration.

The exemplary embodiments do not describe all possible versions of the invention, but only preferred examples. All the technical embodiments referred to herein can, in principle, be utilized in the exemplary embodiments.

What is claimed is:

1. A data processing system for a technical process comprising:
    at least one processing station for processing at least one product, the product having an associated specific data record in which product features and/or process information is maintained;
    a product buffer operably associated with the at least one processing station;
    at least one data record storage location operably associated with the at least one processing station, the at least one data record storage location operable to dynamically maintain at least one product associated specific data record;
    the data processing system operable to provide decentralized access to product associated specific data records such that a processing station is operable to receive one or more product associated specific data records from another processing station and to provide one or more product associated specific data records to another processing station in the data processing system to facilitate completion of the technical process; and
    the at least one processing station operable to search the at least one data record storage location and dynamically match at least one product associated specific data record received at the processing station to a data record length required from a sequence of the technical process.

2. The data processing system according to claim 1, wherein the product's functionality and/or process information for the technical process is formed in a decentralized manner via a data processing appliance.

3. The data processing system according to claim 1, wherein the data record has a data record structure comprising at least one data record entry selected from the group consisting of:
- identifier for features,
- data type information,
- feature,
- dimension unit for one or more features,
- limit values of features,
- validity identifier for features,
- access authorizations,
- process information for a product; and combinations thereof.

4. The data processing system according to claim 3, wherein at least one data record entry is provided with a link in the data record structure of the product.

5. The data processing system according to claim 4, wherein information is called up by means of a data link via a link entry in the data record.

6. The data processing system according to claim 5, wherein an Ethernet with a real-time capability is used for at least one data link.

7. The data processing system according to claim 5, wherein an equidistant Profibus is used for at least one data link.

8. The data processing system according to claim 4, wherein redundant links are used as the data links.

9. The data processing system according to claim 3, wherein the data record or data record structure or parts thereof are provided for visualization on at least one control and monitoring unit.

10. The data processing system according to claim 3, wherein data storage of at least one data record entry is carried out at a predetermined time in the data processing system.

11. The data processing system according to claim 3, wherein at least one data record structure is produced on the basis of a product's features and/or technical process requirements, and the data record structure which is associated with at least one product can be amended.

12. The data processing system according to claim 1, wherein limit values for at least one product feature and/or for at least one data record entry are stored in a processing station, said limit values being used for limit-value checking.

13. The data processing system according to claim 1, wherein the product and/or associated data record can be searched for via any product or data record features.

14. The data processing system according to claim 1, wherein process and/or product data branching, and combination are carried out via branching and/or combination stations.

15. The data processing system according to claim 1, wherein the products can be interchanged with associated data records.

16. The data processing system according to claim 1, wherein consistent process and/or product data access is obtained via internal protection mechanisms by means of encapsulated administration functions at the processing stations.

17. The data processing system according to claim 1, wherein the transmission and/or storage of data is rendered error-free by means of at least one checksum contained in the data record.

18. The data processing system according to claim 1, wherein a data record, or parts thereof are encrypted.

19. The data processing system according to claim 1, wherein storage of data relating to the technical process is an instantaneous record which can be provided at any desired time in the data processing system.

20. The data processing system according to claim 19, wherein relevant data for the instantaneous record is preselected for storage or selected at the time of storage.

21. The data processing system according to claim 19, wherein the data to be stored is stored in an associated processing station at the time of storage.

22. The data processing system according to claim 19, wherein the data to be stored is stored centrally via at least one data link.

23. The data processing system according to claim 19, wherein stored data can be fed to the data processing system at any time.

24. The data processing system according to claim 23, wherein the stored data is present in the respective processing station or is fed to the respective processing station via at least one data link.

25. The data processing system according to claim 23, wherein a data link is used for data storage or feeding.

26. The data processing system according to claim 1, wherein processing stations have a processing clock cycle which is predetermined by a means selected from a clock feed, a product, a data record feed and combinations thereof.

27. The data processing system according to claim 26, wherein the processing clock cycle of a processing station is synchronized with a processing clock cycle of another processing station.

28. The data processing system according to claim 26, wherein the processing clock cycles are not synchronized, or are synchronized to one another only in sections.

29. The data processing system according to claim 1, wherein continuous data maintenance is provided in the event of a failure of the technical process, or an associated data processing appliance.

30. The data processing system according to claim 1, wherein the data processing system provides a production flow direction and data flow direction.

31. The data processing system according to claim 30, wherein the flow directions of the product and its associated data can be reversed in whole or in part during the data processing system.

32. The data processing system according to claim 1, comprising a plurality of processing stations which are freely configured with respect to one another.

33. The data processing system according to claim 1, wherein a product and its associated data record are input and output via input and/or output stations.

34. The data processing system according to claim 1, wherein a processing station is included or excluded at any desired point in the technical process.

35. The data processing system according to claim 1, wherein data records and associated products are passed-on from a respective data or product buffer location to an adjacent data or product buffer location synchronized with the processing clock cycle in the processing station.

36. The data processing system according to claim 35, wherein data records and associated products are passed-on to a next-free data or product buffer location in the processing station.

37. The data processing system according to claim 1 wherein information about a product position in the technical process is transmitted by means of data links.

38. The data processing system according to claim 1, wherein a data record is associated with a partial product at an initial processing station; the data record is transferred electronically, and the product is transferred on a material route in a synchronous manner to a next processing station wherein the product-associated write and/or read operations allowed in the processing station is carried out; and the data record at a processing end station is passed-on to a data processing station, and/or is attached to the product.

39. The data processing system according to claim 38, wherein the data record is deleted.

40. The data processing system according to claim 1, for use in process automation.

41. The data processing system according to claim 1, wherein said system is used to carry out balancing processes.

42. The data processing system according to claim 41, wherein in the balancing process an identification signal is started and carried out over a time interval, and/or for a number of samples selected on the basis of product features and on the basis of process conditions.

43. The data processing system according to claim 41, wherein at least two balancing processes are carried out at the same time.

44. The data processing system according to claim 1, wherein the product is an initial product or an end product, and the associated product buffer is upstream or downstream of the processing station and the associated data record is passed-on in time with a processing station clock cycle.

45. A data processing device for a technical process, comprising
  at least one processing station for processing at least one product, the at least one processing station including at least one closed-loop and/or open-loop control unit;
  a specific data record associated with the at least one product, the associated specific data record operable to dynamically maintain product features and/or process information for the products;
  at least one data record storage location associated with the at least one processing station, the at least one data record storage location operable to dynamically maintain the at least one product associated specific data record;
  a product buffer associated with the at least one processing station; and
  wherein at least on product-associated data record is provided in a decentralized manner at the processing station during the technical process, and which can be passed-on to a further processing station.

46. The data processing device according to claim 45, further comprising at least one data processing appliance having a PC-based architecture.

47. The data processing device according to claim 45, for use in a machine tool, a production machine or a robot.

48. The data processing device according to claim 47, wherein the production machine is a packaging machine.

49. The data processing device according to claim 48, wherein the packaging machine is a pharmaceutical packaging machine.

50. A data processing system for a technical process, comprising:
  at least one processing station for processing at least one product, the product having an associated specific data record operable to maintain features and/or process information for the product;
  a product buffer operably associated with each processing station, the product buffer operable to receive product for processing at the processing station and to maintain product pending processing at the processing station; and
  a data buffer operably associated with each processing station, the data buffer operable to receive and maintain specific data records associated with the product received and maintained by the product buffer and to coordinate delivery of specific data records associated with the product maintained in the product buffer with the delivery of the maintained product from the product buffer to the processing station.

* * * * *